(12) United States Patent
Bosio Blanco et al.

(10) Patent No.: US 7,574,980 B2
(45) Date of Patent: Aug. 18, 2009

(54) DEVICE WITH DISPOSABLE BAG FOR COLLECTING ANIMAL WASTE

(76) Inventors: Carlos Conrado Bosio Blanco, Calle Angel Guimera 33 5to. piso, C.P., 08240 Manresa, Barcelona (ES); Roberto Horacio Blanco, Ruta 202, 1555. C.P., C.P. 1611 Don Torcuato, Buenos Aires (AR); Alejandro Jose Klarenberg, Calle Richieri 1265, C.P. 1611 Don Torcuato, Buenos Aires (AR)

( * ) Notice: Subject to any disclaimer, the term of this patent is extended or adjusted under 35 U.S.C. 154(b) by 58 days.

(21) Appl. No.: 10/570,376

(22) PCT Filed: Aug. 30, 2004

(86) PCT No.: PCT/ES2004/000386

§ 371 (c)(1),
(2), (4) Date: Oct. 31, 2006

(87) PCT Pub. No.: WO2005/020676

PCT Pub. Date: Mar. 10, 2005

(65) Prior Publication Data

US 2007/0199522 A1 Aug. 30, 2007

(30) Foreign Application Priority Data

Sep. 2, 2003 (AR) ............................. P030103172

(51) Int. Cl.
*A01K 23/00* (2006.01)
(52) U.S. Cl. ...................................... 119/868; 119/867

(58) Field of Classification Search ................. 119/161, 119/164, 868; D30/161, 144; 604/317, 353
See application file for complete search history.

(56) References Cited

U.S. PATENT DOCUMENTS

| 3,656,459 | A | * | 4/1972 | Missud | ........................ | 119/868 |
| 4,813,949 | A | | 3/1989 | O'Rourke | .................... | 604/391 |
| 5,819,691 | A | * | 10/1998 | Lavi et al. | .................... | 119/868 |
| 6,059,332 | A | | 5/2000 | Inchaurraga | ................ | 294/1.3 |

FOREIGN PATENT DOCUMENTS

DE 19827997 12/1999
WO WO-0143537 6/2001

* cited by examiner

*Primary Examiner*—Michael R Mansen
*Assistant Examiner*—Monica L Williams
(74) *Attorney, Agent, or Firm*—Andrew Wilford

(57) ABSTRACT

A device for collecting waste of a dog wearing a harness has a polymeric bag having an open end and formed thereabout with a channel and a drawstring extending through the channel and having ends projecting from the bag so that tension on the drawstring closes the open end. An annular and heart-shaped stiffening band extending around the open end is formed inward of the channel with a pair of upper and a pair of lower inwardly directed formations. Respective elastic cords each have a rear end attached to the band and a front end attachable at least indirectly with the harness to hold the bag under a tail of the animal. Each of the cords is releasably attached to the respective inwardly directed formation such that when the open end is closed by tension on the drawstring the cords are released from the formations.

10 Claims, 4 Drawing Sheets

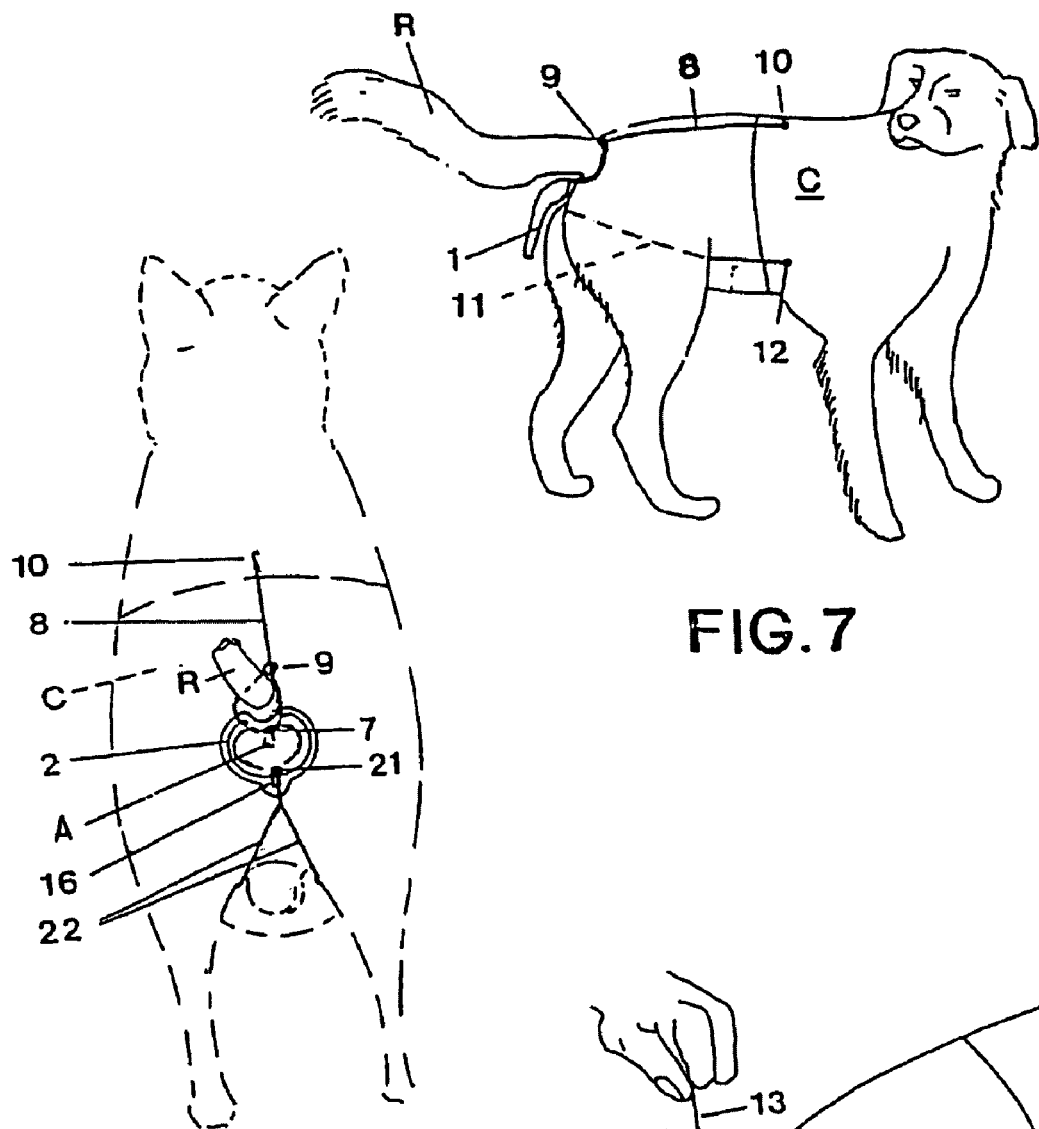
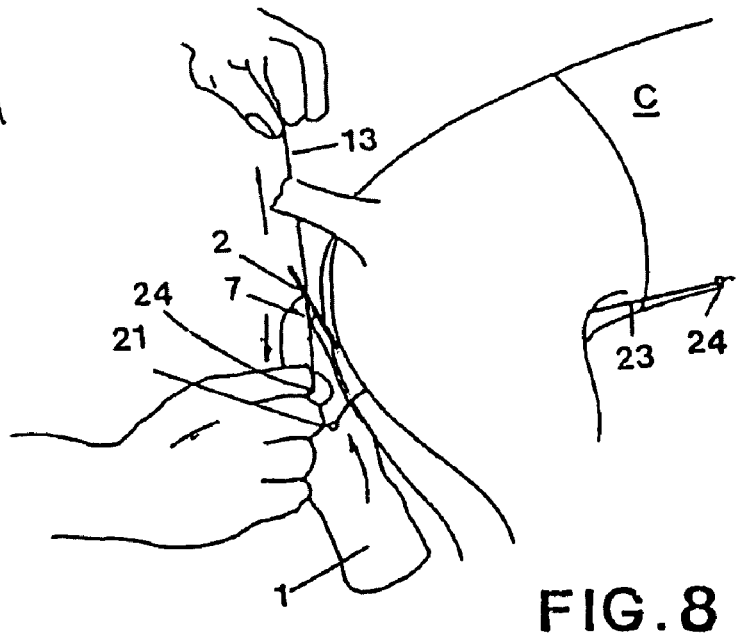
FIG. 7
FIG. 6
FIG. 8

DEVICE WITH DISPOSABLE BAG FOR COLLECTING ANIMAL WASTE

CROSS REFERENCE TO RELATED APPLICATIONS

This application is the US national phase of PCT application PCT/ES2004/000386 filed 30 Aug. 2004 with a claim to the priority of PCT patent application P030103172 itself filed 2 Sep. 2003.

FIELD OF THE INVENTION

This invention relates in general with environmental non-polluting devices, and specifically it relates to a disposable bag device for the collection of animal excrement, applicable for instance to a dog, and that catches the excrement at the same it is being produced, avoiding by this the environmental contamination.

OBJECTS OF THE INVENTION

It is the main object of this instant invention to provide a simple device easy to apply to the pet before its outdoor walk, this being generally the time at which the animal relieves itself.

The device of this invention should provide a good adaptability of the disposable collecting bag for the excrement deposition around the anal orifice of the pet.

Another object of this instant invention is to be found in its intrinsic nature allowing the pet's owner a clean, fast and assured hygienic handling of this device, closing and withdrawing the disposable bag immediately after the excrement deposition which will be enclosed within the bag, waiting to be discarded in an appropriate place.

The structural embodiment of this instant invention should allow it to be rapidly adapted to a pet of any size, without causing undue inconveniences to the pet or hindrance to its normal behavior until its withdrawal once its purpose has been achieved.

PRIOR ART

The prior art in this subject recognizes several constructions that have been developed in order to eliminate the contamination of open spaces and gardens with organic residues produced by the domestic animals during their outdoor stays.

To solve the above stated problem it has been proposed to collect the pet's excrement by means of small shovels, placing the depositions into bags that when closed are discarded into any street or public trash collector.

Argentine Patent application AR P98 01 06432 teaches "A disposable excrements collector basically applicable to dogs." This construction is made of a bellows-type bag facing the anal orifice of the dog. The bag has in its perimeter elements allowing tying this bag to the tail of the animal, its hind legs and a drawstring or thread to close the bag. This construction has the following problems: The means or elements that can be used to tie the bag to the tail of the dog and to connect it with the hind legs constitute complicated fastenings requiring adjustments in order to avoid its detachment or displacement, providing the animal with a source of nuisance due to the increased pressure over the parts of its body. Moreover it is cumbersome to remove this device from the animal, once if has been used.

Patent publication WO 2001/043537 A1 teaches a simple pet's excrement collector. It is made of an annular inner band by means of which it is applied to the collecting bag fastened by means of another band attached over the first one. The bands are placed around the anus and are maintained in position by means of two loops sustained by lateral cords laid along the inner hind legs of the dog, looping over its hip and joined over the back of the animal with two other cords tied to the inner annular band and extended on both sides of the tail. To withdraw the bag retained between the two bands this whole set-up has to be disassembled, while the bag has to be closed manually.

U.S. Pat. No. 4,813,949 teaches a "Diaper for dogs" made of a textile band shaped as a "T" for the body and tail. A bifurcation projects from the center of the band with "Velcro" fasteners in one or both ends and an absorbent pad is fixed on the inner face of the band facing the tail. It follows from this construction it offers a partial and limited protection.

German patent DE 19 827 997 offers another "Disposable diaper for dogs of all sizes." Is quite similar in its shape to the know diapers for babies, fastened by means of adhesive fastening bands.

U.S. Pat. No. 6,059,332 teaches a "Domestic pet's excrement collector." It comprises two similar rectangular structures facing each other and joined in between by a posterior concave-convex wall forming a pincer-shaped hinge for the collector. Over the convex face of the wall is fixed a cylindrical tube closed at one end, having inside of the tube a roll of continuous bags, while the other end of the tube is closed by a lid. The plastic bag is placed covering the collecting pincers. The bottom of the bag is contained within the pincers towards the cylindrical tube. This complex construction does not relate to the present invention.

None of the mentioned prior-art patents offers a construction similar to this instant invention, providing a very simple solution having a low cost base structure or frame, to which is attached the disposable plastic bags within which the pet's depositions are collected at the same time they are being produced, such as detailed down below.

Once the bag has been used, it is withdrawn in a rapid and hygienic manner, providing to its hermetic closing and ready to be discarded.

DESCRIPTION OF THE PREFERRED EMBODIMENT OF THIS INVENTION

This instant invention comprises a disposable laminar thermoplastic material bag used for the collection of excrement and offers an ideal solution to the above stated problems, and it is identified by having around the opening of the bag a tuck in its edge, within which slides a drawstring whose free ends extend out of the tuck and form the closing means of the bag; concentrically adhered to a part of the surface of the bag and coaxially adjacent to its opening and tuck is an annular band made of a semi-rigid material, provided in its upper and lower parts of its outer perimeter with attachment means to corresponding elastic cords; of the elastic cords, one of them has a shorter length and is connected to another longer cord between the ends thereof and closing around the animal's tail, while the other elastic cords are anchored to the body of the animal, providing these elastic cords the positioning means of this device on the animal placing the bag's opening and the enclosed area of the annular band around the anal orifice of the animal; in coincidence to each of the cords attachment means placed in the outer perimeter of the annular element, it is found at its inner perimeter a set of corresponding seats retaining a portion of the bag's surface adjacent to the tuck, acting as retaining means a portion of length of the corresponding elastic cord looping around the portion of the bag and connected to the pair of attachment means and seats, while interposed between each portion of the surface bag thus retained and the seats it is placed a portion of the drawstring sliding within the tuck; determining the drawstring when pulled at its end the contemporary closing of the bag's opening and the release of the portion of the bag from the seats and its retaining means.

In order to provide a detailed and comprehensible construction of this instant invention consisting in a device with a disposable bag for collecting animal excrement, applicable to dogs and other domestic animals at the same moment in which the depositions are being produced, thus enabling to exemplify how this invention may be practically rendered, it follows a precise description of one of the preferred embodiments of this instant invention with the aid of the enclosed drawings, being given this description and drawings as a mere illustrative example of the invention with any limitative purpose to its actual scope, while its means and components may be selected between several divers equivalents without moving away of the scope of this invention as defined in this instant documentation.

BRIEF DESCRIPTION OF THE DRAWING

In the enclosed drawings:

FIG. 6 is a schematic view showing how one of the above embodiments is applied to a dog;

FIG. 7 depicts another view of the dog fitted with this hygienic device; and

FIG. 8 shows a partial view of the dog at the moment in which this collecting device filled with the dog's excrement is being taken off the animal.

SPECIFIC DESCRIPTION

Figure 1:
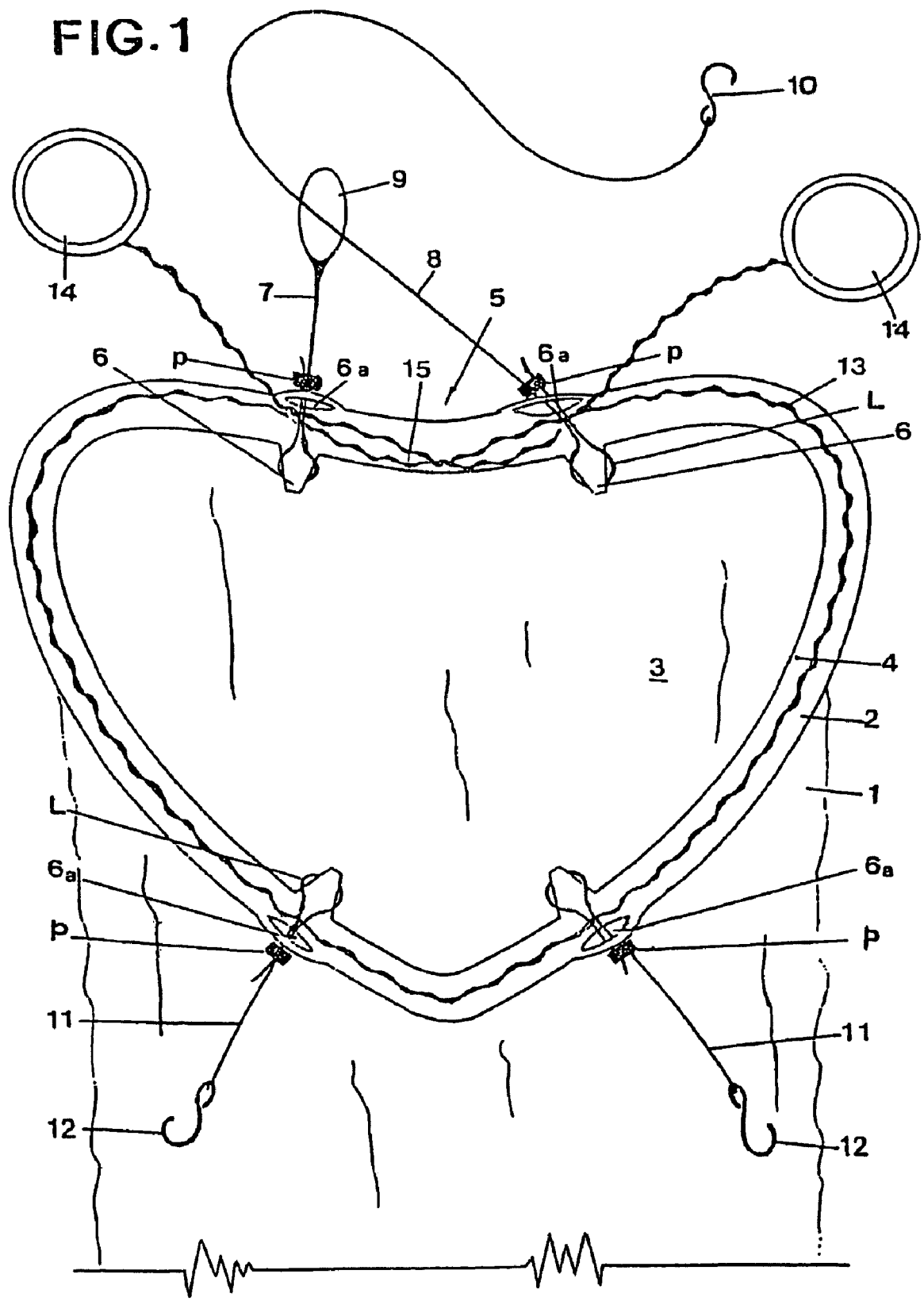
FIG. 1 shows a schematic frontal view of this invention's device with the disposable bag in its unfolded position.

In the drawings the same references corresponds to the same components or means or its equivalents.

Figures 2, 3:
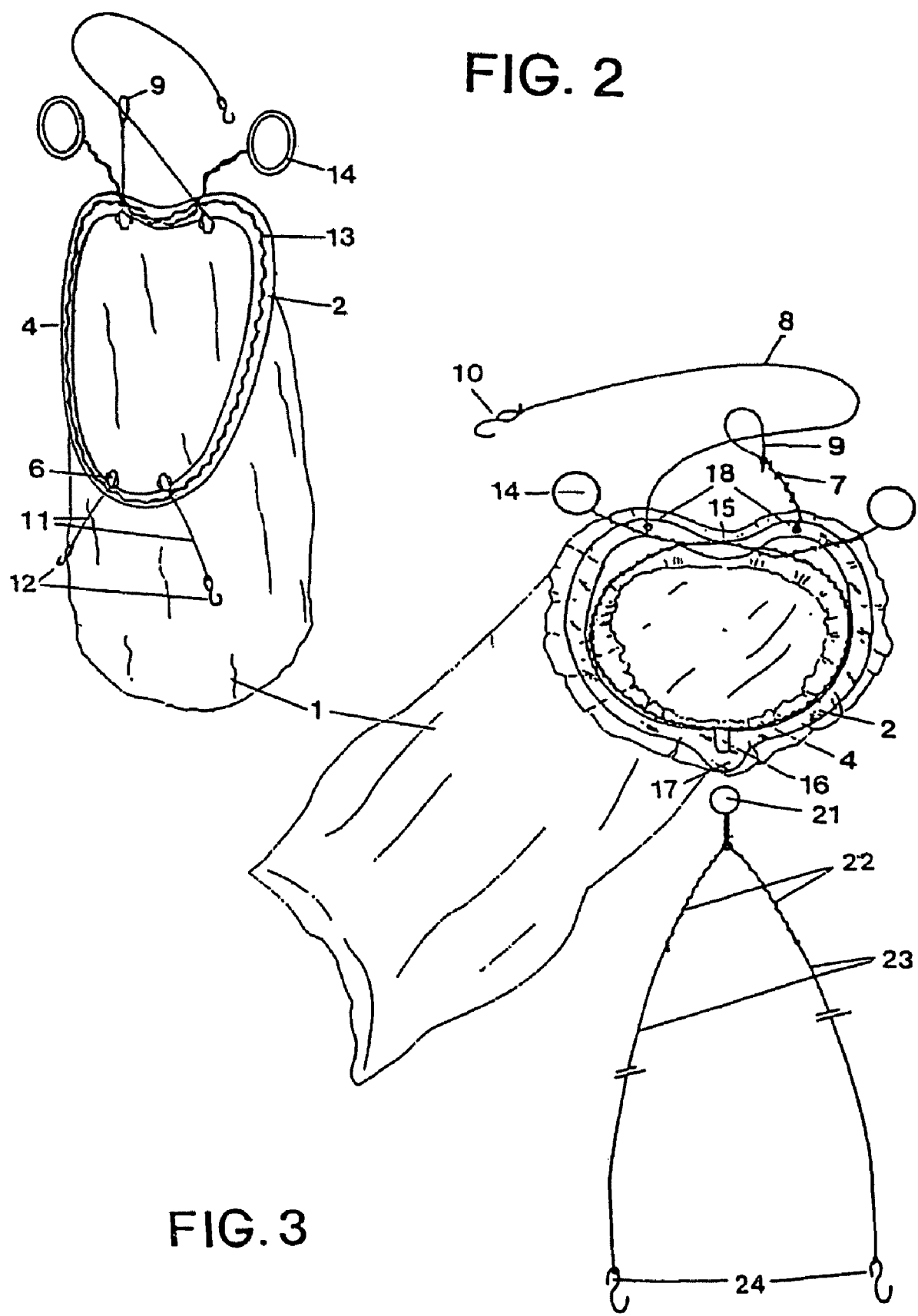
FIG. 2 depicts a perspective view of FIG. 1.
FIG. 3 depicts another construction of this invention.

FIGS. 1 and 2 show the device of this invention with its disposable collecting bag 1 of the kind manufactured from a polymeric film, fitted at its opening edge with an annular band 2 coplanar to its opening 3. A fold of this bag can be thermo-soldered to facilitate its fitting and once this annular element is fitted, it forms a tuck 4. Any other appropriate form or adhesive that may be suitable to maintain in position this annular band 2 may be also used.

The annular element 2 is made from a somewhat stiff material, such as aluminum, cardboard or the like, giving to the annular band essentially a heart shape, with is concavity 5 its upper end. Projecting into its inner area it has a series of triangular tabs 6 spaced around the bag's opening 3, having at these same places eyelets 6a formed in the annular element 2. Elastic cords 7, 8 are engaged with the upper tabs 6 by small loops L, extend through the respective eyelets 6a, and are latched in their position by means of knots or seals p. The string 7 is shorter and it ends in a loop 9, while the string 8 is longer, extends through the loop 9, and ends in a hook 10.

Alternately the strings 7, 8 have the same length and may each end with corresponding hooks 10, for their independent engagement.

The other tabs 6 at the lower edge of the annular band 2 are engaged, like the upper tabs, to two other tightening elastic cords 11 threaded through respective eyelets 6a and ending in hooks 12.

Concentric to the opening 3 of the bag 3 and running within the tuck 4 that carries the annular element, or of any other construction to this same ends, is a drawstring 13 with two rings 14 at its ends which cross each other when they reach the upper concavity 5, or the opposed lower edge according to the laying out of the tuck 4, forming a loose overhand knot 15.

FIG. 3 shows another embodiment of this invention having the bag 1 ready to operate as an excrement collector. This embodiment is provided with an annular band 2 similar to the former but lacking the inner tabs 6. This band 2 is placed around the bag's opening 3 and is adhered and/or attached around the opening, such as in the former case, with its concavity 5 similarly placed, further having two orifices 18 symmetrically placed at both sides of the concavity in its upper part and with a slot 16 formed in its internal lower edge, followed by an appendage 17.

Similar to the former construction and concentric with the bag's opening 3, the tuck 4, or to any other equivalent constructions as used receives the drawstring 13 with its end rings 14 and its knot 15 placed in correspondence with the zone of the heart-shaped concavity 5. Two elastic cords 7 and 8 are threaded through the orifices 18, retained there by knots. One of the cords, such as cord 7 as mentioned in the previous embodiment, is shorter and provided at its end with a loop 9, while the longer string 8 is threaded through the loop 9 and has at its end a hook 10.

The device comprises also an independent cord provided at one end thereof with a body in the shape of a ball acting as a stop and bifurcating into two branches 22 that are elastically continued at 23 and end with corresponding engagement means, such as hooks 24 or the like.

Figure 4:
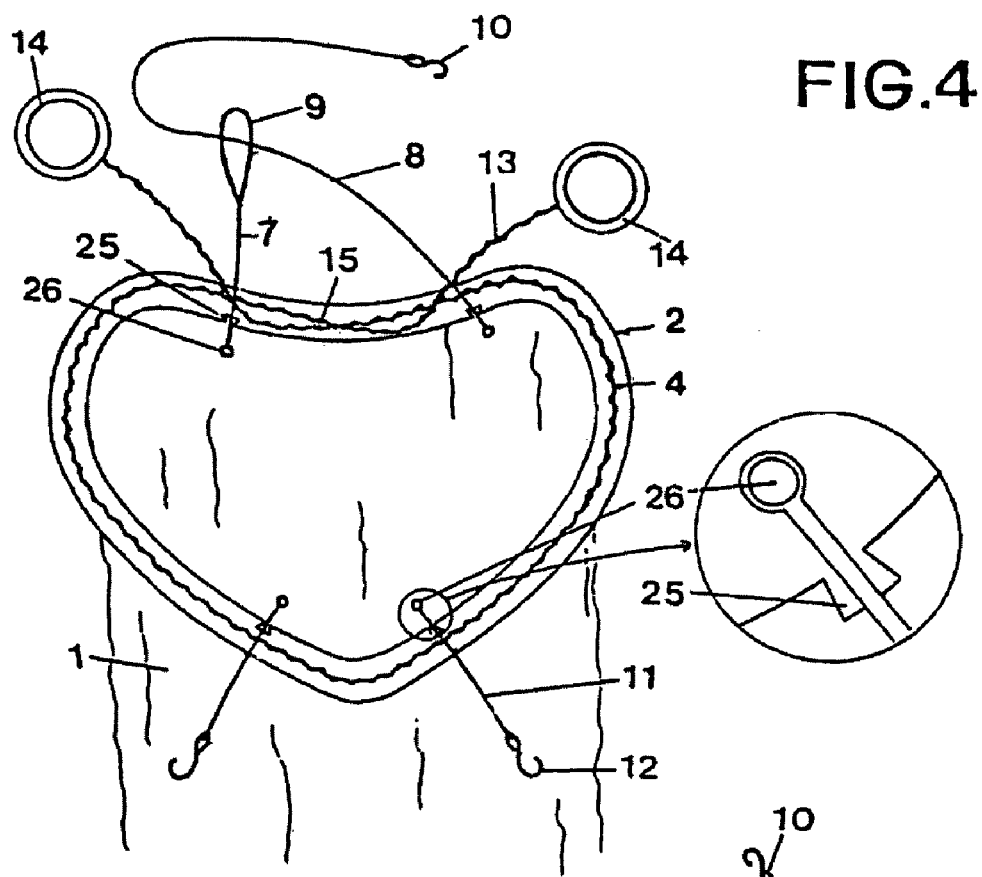
FIG. 4 shows still another embodiment of the main constituent part of this invention.

Another alternative embodiment of this invention shown at FIG. 4 includes the known bag 1 of laminar thermoplastic material having at its opening the heart shaped annular band 2.

In this construction the upper tabs 6 of the inner edge of the band are replaced with trapezoidal notches 25 through which pass the cords 7, 8, and 11, in this instance attached to the bag 1 at 26. The bag's closing cord or drawstring 13 ending with the rings 14 is placed in the same manner as depicted in FIG. 1.

Figure 5:
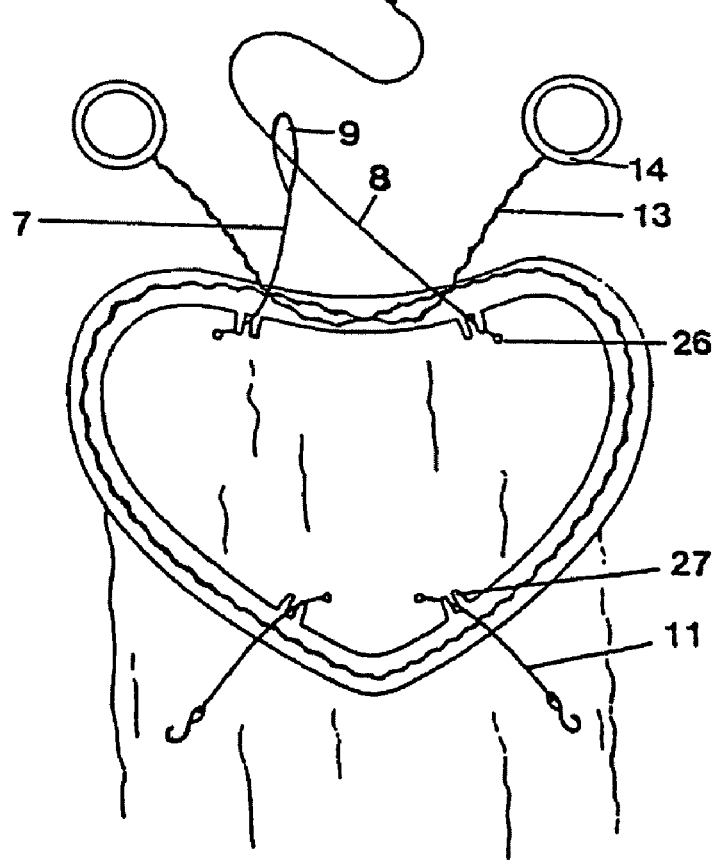
FIG. 5 shows another possible construction of this same invention.

The alternative embodiment illustrated of FIG. 5, equivalent to the ones above explained, includes all the basic components of the invention with only a slight modification of the inner contour of the heart-shaped band 2 in that it includes guides shaped as forks 27 distributed in the upper and lower regions thereof in pairs, through which pass the cords 7, 8, 11 in the same manner as above explained.

How this Invention Works:

The above-given description of the several components of this invention as well as their nature as given above is completed as follows with the detailed description of the functional and operative relationship of the components and its given results, according to the enclosed drawings.

The device of the invention can be applied to any breed of dog in order to collect the dog's excrement at the same instant it is produced. To this end the dog conveniently may wear a harness, including a chest harness of a commercially available design, or adequate engagement means capable to retain in place the device when fitted to a dog.

This device is placed on the dog with its opening 3 facing the anus A of the animal while the concavity 5 of the annular heart-shaped band 2 is placed underneath the tail R, directed upward for this particular shape of the band.

According to FIGS. 1 and 2, cords 7, 8 placed around the animal's tail and the string 8 is threaded through the loop 9, proceeding next to where the hook 10 engages the harness C worn by the animal. Is to be noticed that the cords 7 and 8 gently embrace the base of the dog's tail without exerting undue pressure on the tail, thus defining a sure anchorage for the device and when the cord 8 is pulled for its engagement, it surrounds the tail R without strangling it.

The elastic cords or strings 11 extend forward between the back legs of the animal and are engaged by their hooks 12 to the engagement means or harness C worn by the animal.

When it is wished to withdraw the device, once it purpose has been fulfilled, the knot 15 is tightened gently by pulling on the rings 14 at the ends of the drawstring 13. As the drawstring 13 is being tightened, closing at the same time the bag 1 opening, the strings 7, 8, 11 are detached from behind the annular band 2.

In this way closing of the opening is done easily and without any risk of spilling its contents, proceeding after this to discard the bag without any further inconveniences, hygiene problems or environmental contamination. The now detached lateral stays or cords 7, 8, and 11 that are still on the animal may be also removed and discarded.

In the construction according to FIGS. 4 and 5, the hooks 10, 12 are disengaged from the tensioning cords or strings and when the knot 15 is being tightened acting on the rings 14, the bag 1 is closed pulling them along to be also discarded. According to the embodiment of FIGS. 3 and 8, the hooks 24 are also disengaged and the knot 15 is also tightened by pulling on the rings 14 at the ends of the drawstring 13, as shown by the arrows in FIG. 8.

When it is being pulled, the drawstring 13 closing from behind of the band 2 and the opening of the bag 1, it also lifts the small ball 21 dislodging it from the slot 16 and letting it fall, as also depicted in FIG. 8, simultaneously dropping from the bag its lateral staying cords or strings 22, 23 which can then be also discarded.

In the case depicted at FIG. 3, fitting of this device is completed by engaging the ball 21 into the slot 16 or the annular element 2, the branches 22, 23 are extended flanking the thighs of the dog without touching its genitals and without touching the legs, continuing at both sides of the body until they are laterally engaged at the adequate height in the dog's harness C. The elastic strings 7, 8, 23 of this device are used to adapt and apply it to the various sizes of dogs, while at the same ensuring the correct positioning of this device.

The complementary bifurcated or branched length 22, 23 works as stays in order to ensure the correct fitting of this device at its proper position, completing in this manner three anchoring points in perfect equilibrium.

When the need arises to remove this device whenever its purpose has been accomplished, as shown at FIG. 8 the hook 10 attached to the harness over the back of the animal is disengaged while the knot 15 is also tightened by gently pulling from the rings 14 at the end of the drawstring 13, according to the arrows in the figure. When the drawstring is closing the opening of the bag 1 behind the annular element 2, it pushes on the ball 21 dislodging it from its seat on the groove 16 allowing it to fall and at the same time releasing the bag from its lateral staying cords or strings 22, 23, as also illustrated in FIG. 8.

The closing of the bag is easily achieved without any possibility of spilling its contents, proceeding to its disposal without incurring in any contamination problems either for the user or the environment, with full hygienic and good health conditions. The lateral stays are then released and may be also discarded.

One of the possible embodiments of this invention has been explained and illustrated in the above description as well as an explanation how it performs, including an example of its specific use. This instant invention is completed by the following claims.

We claim:

1. A device for collecting waste of an animal wearing a harness, the device comprising:
    a polymeric bag having an open end and formed thereabout with a channel;
    a drawstring extending through the channel and having ends projecting from the bag, whereby tension on the drawstring closes the open end;
    an annular stiffening band extending around the open end and formed with at least one inwardly directed formation;
    a plurality of elastic cords each having a rear end attached to the band and a front end attached to the harness to hold the bag under a tail of the animal, one of the cords being releasably attached to the inwardly directed formation such that when the open end is closed by tension on the drawstring the one cord is released from the formation.

2. The waste-collecting device defined in claim 1 wherein the formation is an inwardly projecting tab and the one cord has a loop engaged over the tab.

3. The waste-collecting device defined in claim 1 wherein the formation is an inwardly open notch and the one cord extends through the notch and is provided at its rear end with an element that cannot pass through the notch.

4. The waste-collecting device defined in claim 3 wherein the element is a ball.

5. The waste-collecting device defined in claim 1 wherein the passage is outside the formation so that the band is inverted when the drawstring is tensioned.

6. The waste-collecting device defined in claim 1 wherein the band is provided with a plurality of the formations and all of the strings have their rear ends releasably attached to respective ones of the formations, whereby all the cords are detached from the band when the drawstring is tensioned.

7. The waste-collecting device defined in claim 1 wherein the band is formed adjacent the formation with a throughgoing eyelet through which passes the one cord.

8. The waste-collecting device defined in claim 1 wherein one of the cords is long and has a hook at its front end, another of the cords being short and having a loop at its front end through which the long cord passes.

9. The waste-collecting device defined in claim 1 wherein the band is heart shaped.

10. A device for collecting waste of a dog wearing a harness, the device comprising:
    a polymeric bag having an open end and formed thereabout with a channel;
    a drawstring extending through the channel and having ends projecting from the bag, whereby tension on the drawstring closes the open end;
    an annular and heart-shaped stiffening band extending around the open end and formed inward of the channel with a pair of upper and a pair of lower inwardly directed formations; and
    respective elastic cords each having a rear end releasably attached to the band at a respective one of the formations and a front end attached at least indirectly with the harness to hold the bag under a tail of the animal, each of the cords being releasably attached to the respective inwardly directed formation such that when the open end is closed by tension on the drawstring the cords are released from the formation.

* * * * *